July 24, 1962 L. F. PERKINS Re. 25,208
OIL GAUGE
Original Filed July 25, 1957
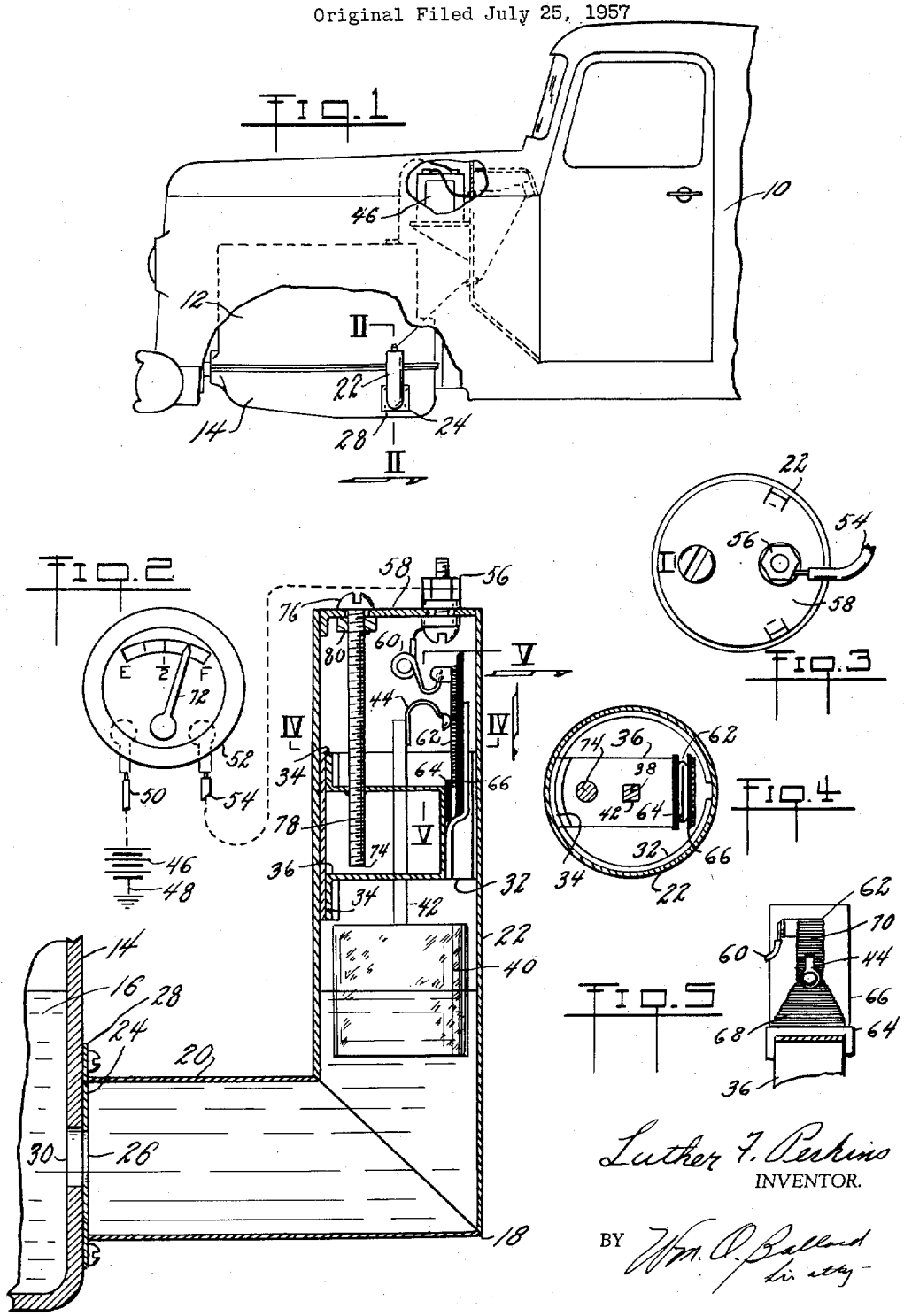
Luther F. Perkins
INVENTOR.
BY Wm. O. Ballard
Its Atty.

United States Patent Office

Re. 25,208
Reissued July 24, 1962

25,208
OIL GAUGE

Luther Fred Perkins, 538 Camp St., Sandusky, Ohio

Original No. 2,926,526, dated Mar. 1, 1960, Ser. No. 674,123, July 25, 1957. Application for reissue Feb. 19, 1962, Ser. No. 174,327
4 Claims. (Cl. 73—313)

Matter enclosed in heavy brackets [ ] appears in the original patent but forms no part of this reissue specification; matter printed in italics indicates the additions made by reissue.

This invention relates to gauges.

The commercial use of my former invention as disclosed in United States Leters Patent No. 2,738,674, issued March 20, 1956, indicated that the improvements herein provide a smoother, more stable operation, eliminating any fluctuations of the indicator, with a resultant more accurate and easier reading thereof, and furthermore incorporates additional desirable features.

An object of this invention is to provide a gauge which will accurately *indicate or* register the volume or level of oil in the oil pan of an internal combustion engine, compressor or the like.

Another object of this invention is to provide a sealed unitary construction readily attached to the oil pan of an internal combustion engine with a minimum of connections, and to provide an adjustable circuit for operating a visible *indicator or* gauge on the dashboard of a motor vehicle.

Another object of this invention is to provide a simple construction readily adjustable from the exterior thereof to accommodate and correct any variations in the *indicator or* gauge readings. Any disassembling of the device to make the corrective adjustments is eliminated.

And another object of this invention is to provide an oil gauge for an internal combustion engine which will steadily indicate the volume of oil in the oil pan, regardless of disturbances within the pan or movements of the vehicle driven by such engine.

Other objects and advantages of this invention relating to the arrangement, operation and functions of the related elements of the structure, to various details of construction, to combination of parts and to economies of manufacture, will be apparent to those skilled in the art upon consideration of the following description and appended claims, reference being had to the accompanying drawings forming a part of this specification wherein like reference characters designate corresponding parts in the several views.

FIG. 1 is a partial side elevation of a motor vehicle having an internal combustion engine equipped with a gauge incorporating the improvements disclosed herein;

FIG. 2 is a view on the line II—II, FIG. 1;

FIG. 3 is a plan view of the gauge unit;

FIG. 4 is a view on the line IV—IV, FIG. 2; and

FIG. 5 is a view on the line V—V, FIG. 2.

The invention herein may readily be adapted to any machine which includes an oil pan, but is herein shown installed in a motor vehicle.

Motor vehicle 10 is powered by an internal combustion engine 12, including an oil pan 14. This pan contains oil supply 16, a certain volume of which must be present to insure efficient operation of the engine 12, and which volume requires periodic inspection for its maintenance. The gauge herein indicates the volume at all times during engine operation so that the effort incident to such inspection is reduced to a minimum.

The device includes a tubular L-shaped element 18 having a minor horizontal extension 20 in a connection with a vertical major chamber providing portion 22. The minor extension 20 is attached as by welding to mounting plate 24, which plate is provided with an axial aperture 26 therethrough, and a flange 28 serving as means for attaching said unit 18 to the side of the oil pan, which pan is in turn provided with an aperture 30 therethrough in register with said aperture 26.

It will be seen that oil from the pan will flow into the unit 18 until the level of oil in the vertical chamber or major tube 22 is coplanar with the oil in the pan, and due to the restricting apertures 26, 30, any turbulences or wave action within the oil in the chamber 22 is eliminated, regardless of disturbing features which may affect the oil in the pan.

It is apparent the gauging of the oil in the chamber 22 will accurately reflect the level of the oil in the pan 14.

Frictionally held within the chamber 22, intermediate its length, is a split ring support 32, which is vertically adjustable within such chamber, as hereinafter described. This ring is provided with a pair of oppositely extending fingers 34, which mount a horizontal extending U-shape bracket 36 therein. The substantially parallel legs of this U-shaped bracket are each provided with an aperture 38, thereby providing a pair of aligned bearings.

A float 40 is disposed within the chamber 22 which rises and falls with the level of the oil therein. This float has polygonal stem 42 upwardly extending therefrom through the apertures 38, which serve as bearings therefor and maintain the float in a non-rotary coaxial alignment within the chamber 22. The end of the stem 42 remote from the float mounts spring finger 44.

A source of electric energy is provided such as a battery 46 having one terminal connected by a line 48 to ground. The other terminal is connected by line 50 to one terminal of a gauge instrument 52 mounted on a convenient support such as the dash of the motor vehicle. The other terminal of the instrument is connected by line 54 to a terminal 56 mounted on cap 58 permanently fixed in the upper end of the chamber 22, thus sealing the chamber to prevent any tampering with the mechanism within such chamber. The terminal 56 extends through the cap 58 and is insulated therefrom and has line 60 extending from its housed portion to a resistance *or other electrical contacting means* 62. This resistance *or means* 62 is fixedly mounted on the bracket [38] *36* and insulated therefrom by plates 64, 66.

A preferred form of resistance is herein shown as having an upwardly tapered shaped base 68 continuing into a rectangular extension 70. Any axial movement of the float 40 causes the finger 44 to slide along the face of the resistance, thereby varying the current flow in the lines 54, 60 to ground. The variance is translated by the gauge 52 into positioning the pointer 72 in its indicating position. The shape of the resistance increases the nicety of readings particularly in the lower oil levels.

Adjustments or corrections may be made in the gauge circuit by raising or lowering the resistance element within the chamber 22. To this end a screw 74 is carried by the cap 58 having its slotted head 76 exposed thereon and having its shank 78 extending downwardly within the chamber to threadedly engage the bracket 36. Rotation of the screw causes the bracket 36 and the slit ring mounting 22 to be shifted vertically within the chamber 22. Collar 80 about the shank 78 abutting the under side of the cap 58 maintains the screw against any axial shifting thereof.

To adjust the *electrical contacting means or* resistance, it is only necessary to rotate the screw head exterior of the device to thereby adjust the position of the *electrical contacting means or* resistance body in respect to the finger 44. This eliminates any necessity of seeking access to the unit interior, which defeats any invitation to tamper with the mechanism and protects against possible contamination.

The mounting 32 has sufficient frictional contact with the housing 22 to prevent any looseness between the parts, yet allowing the adjustments from its exterior.

It is to be understood that the above description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. An oil gauge for indicating the level of oil in an oil pan of an internal combustion engine, said oil pan including a bottom with sides upwardly extending therefrom and provided with an opening through one of said sides of a size to allow free flow of oil therethrough, an L-shaped tube of substantially constant diameter throughout its length greater than the diameter of said opening and including a minor horizontally disposed portion in communication with said opening and a major vertical portion as a continuation thereof whereby oil from the pan will maintain a body of oil in said major tube portion with a surface co-planar with the surface of oil in said pan, a split ring frictionally mounted within the major tube intermediate its length, a resistance thereon, a contact slidable along said resistance, a float on the oil in said major tube portion having an extension mounting said contact and controlling its position relative to the resistance and the surface of the oil in said tube, an electric circuit including a gauge remote from and including said resistance to operate said gauge in response to the position of said contact with the resistance, a cap for said tube fixed thereto, means mounted by said cap having an exposed element, and means extending from said element into the tube to engage said ring whereby manipulation of said element may adjust said ring vertically along the interior of said tube and consequently the position of said resistance relatively to the surface of the oil in said tube.

2. The structure set forth in claim 1 wherein the element and the means extending therefrom is a screw having its head exposed to the exterior of the cap and its shank extending into the tube to be threadedly engaged with the split ring structure.

3. The structure set forth in claim 1 wherein the resistance incorporates a body having a tapered base merging into a rectangular extension thereof.

4. An oil gauge for indicating the level of oil in an oil pan [of an internal combustion engine], said oil pan including a bottom with sides upwardly extending therefrom and provided with an opening through one of said sides of a size to allow free flow of oil therethrough, an L-shaped tube of substantially constant diameter throughout its length greater than the diameter of said opening and including a minor horizontally disposed portion in communication with said opening and a major vertical portion as a continuation thereof whereby oil from the pan will maintain a body of oil in said major tube portion with a surface co-planar with the surface of oil in said pan, said major vertical portion having its upper end closed by a fixed cap, a split ring frictionally mounted by the *major vertical tube* portion intermediate its length, a bracket mounted by said ring, [a resistance] *electrical contacting means* fixed on said bracket vertically extending therefrom, a contact slidable along said [resistance] *means,* a float on the oil in said major tube portion having an extension slidably mounted in said bracket and mounting said contact for controlling its position relative to the [resistance] *electrical contacting means,* and means for shifting said ring axially [with] *of* the tube including a screw mounted by said cap having its head exposed and a shank depending therefrom through the cap and into said tube to threadedly engage said bracket.

References Cited in the file of this patent or the original patent

UNITED STATES PATENTS

| | | |
|---|---|---|
| 1,745,782 | Cheney | Feb. 4, 1930 |
| 2,738,674 | Perkins | Mar. 20, 1956 |